United States Patent [19]
Lévy et al.

[11] 4,355,214
[45] Oct. 19, 1982

[54] ADAPTIVE ECHO CANCELLER FOR FULL-DUPLEX TRANSMISSION OF DATA

[75] Inventors: Michel Lévy, Massy; Jean-Philippe Haag, Paris, both of France

[73] Assignee: Compagnie Industrielle des Telecommunications Cit-Alcatel, Paris, France

[21] Appl. No.: 161,969

[22] Filed: Jun. 23, 1980

[30] Foreign Application Priority Data

Jun. 22, 1979 [FR] France .................... 79 16087

[51] Int. Cl.³ .................................... H04B 3/24
[52] U.S. Cl. .................................... 179/170.2
[58] Field of Search ............ 179/170.2, 170.6, 170.8

[56] References Cited
U.S. PATENT DOCUMENTS

| | | | |
|---|---|---|---|
| 4,087,654 | 5/1978 | Mueller | 179/170.2 |
| 4,117,277 | 9/1978 | van den Elzen et al. | 179/170.6 |
| 4,162,378 | 7/1979 | Baudoux et al. | 179/170.2 |

FOREIGN PATENT DOCUMENTS 2740123  3/1978  Fed. Rep. of Germany .

OTHER PUBLICATIONS

Stephen B. Weinstein, "A Passband Data-Driven Echo Canceller for Full-Duplex Transmission on Two-Wire Circuits", IEEE Transaction on Communications, vol. COM-25, No. 7, Jul. 1977, pp. 654–666.
L. E. Zegers et al., "Digital Signal Processing and LSI in Modems for Data Transmisson", Philips Journal of Research, vol. 33, No. 5/6, 1978, pp. 226–247.
A. Tannhauser et al., "Aspects of Digital Signal Processing in Voice Band Modems", IEEE Conference Record 1978, National Telecommunications Conference, vol. 3, Dec. 3–6, 1978, pp. 46-6-1 to 46-6-4.
J. R. Berland et al., "Choix et Definition d'un Egaliseur automatique adaptatif pour Modem a 9600 bits/sec", Proceedings of the International Seminar on Digital Communications, Mar. 12–15, 1974, pp. $H_5(1)$ to $H_5(6)$.

*Primary Examiner*—Joseph A. Popek
*Attorney, Agent, or Firm*—Sughrue, Mion, Zinn, Macpeak & Seas

[57] ABSTRACT

An echo canceller for a full-duplex carrier modulation transmission system terminal. The echo canceller includes a digital time-domain complex transversal filter with controlled weighting coefficients and an offset equal to a submultiple 1 of a Baud period $\Delta$ related to a rate at which a stream of complex symbols is received at the input of the filter. These complex symbols include complex symbols outputted by a coder of a transmitter of the terminal at the rate $1/\Delta$ interleaved with l-1 null symbols. The transversal filter output is connected to a digital modulator operated at the transmitter carrier frequency with instantaneous values updated at intervals equal to the Baud period to generate a passband echo copy signal. The invention is of particular benefit in transmission systems in which the product of the transmission carrier frequency and the Baud period is an integral multiple of 1/4, as digital implementation of the modulator is then extremely simple.

6 Claims, 5 Drawing Figures

ADAPTIVE ECHO CANCELLER FOR FULL-DUPLEX TRANSMISSION OF DATA

FIELD OF THE INVENTION

The present invention concerns passband full-duplex (simultaneous two-way) transmission of data using a single transmission channel and the same frequency band for both transmission directions. It is more particularly concerned with eliminating spurious signals at the receiver produced by leakage of signal between the output of the transmitter and the input of the receiver of the same terminal equipment.

BACKGROUND OF THE INVENTION

The power level of such spurious signals may be higher than the received signals. The spurious signals must be strongly attenuated, especially at high transmission speeds in full-duplex mode. They are mainly the result of direct leakage due to less than perfect separation between the send and receive channels of each terminal, producing a local echo. Channel separation is achieved by balanced hybrid couplers which must be matched to the characteristic impedance of the transmission channel. Separation is never perfect in that there is always a certain degree of mismatch since the characteristic impedance of the transmission channel can not be synthesised in a simple manner, varies with time and may not be known accurately (when using the public switched telephone network, for example). Spurious signals also arise from indirect leakage producing delayed echoes by reflection at impedance mismatches at various points along the transmission channel.

These spurious echo signals are eliminated by means of echo cancellers which generate a copy of the echo signal from the transmitter output signal and subtract this from the signal received at the same terminal. Adaptive echo cancellers, in which operation is controlled on the basis of an error signal derived from the receiver input signal, are often used to match the copy of the echo signal to the original echo signal.

It is known to construct an adaptive echo canceller from a time-domain transversal filter with controlled weighting coefficients and a subtractor circuit. The transversal filter intertap interval is less than the Nyquist interval of the transmitted signal (the reciprocal of twice the maximum frequency of the transmitted signal). The filter receives the output signal from the transmitter and synthesises a copy echo signal. The subtractor generates the receiver input signal by subtracting this copy echo from the received signal. The receiver input signal is also used to control the transversal filter weighting coefficients.

In this type of adaptive echo canceller, a digital transversal filter is expensive as it must operate at high speed on parameters (weighting coefficients and transmitter output signal samples) which must be encoded using a large number of digits. It has therefore been proposed to synthesise the copy echo signal from the data to be transmitted, rather than from the signal as transmitted. More specifically, the copy echo signal is synthesised from multivalent symbols substituted for the data on transmission. These symbols may be encoded using a smaller number of digits in view of the limited number of possible states.

It is standard practice in data transmission to replace the stream of data to be transmitted either by a stream of multivalent real symbols at a lower transmission rate and filtered prior to transmission on one channel, or else by a stream of pairs of multivalent real symbols likewise at a lower transmission rate and filtered prior to transmission, but transmitted on two independent channels in phase quadrature. The first of these methods is used in particular for synchronous baseband data transmission or in shifted band data transmission using single sideband or residual sideband amplitude modulation. The second method is used for passband synchronous data transmission using amplitude modulation of two carriers in phase quadrature, such as 4 or 8-state phase shift modulation or combined phase and amplitude modulation. In view of the use of two independent channels in phase quadrature, it is standard practice to consider the second method as equivalent to the first by regarding the pair of symbols as the real and imaginary parts of a single complex symbol and using the concept of complex filtering. For convenience, it will be assumed in the following description that the transmitter of carrier modulation synchronous data transmission equipment comprises a coder converting the stream of data to be transmitted into a stream of multivalent complex symbols at a reduced transmission rate, a complex signal-shaping filter and a modulator receiving two carriers in phase quadrature and, on respective inputs, the real and imaginary parts of the aforementioned complex symbols, after shaping in the filter.

Known in the prior art are echo cancellers which synthesise the copy echo signal from complex symbols output by the transmitter coder. These cancellers comprise:

a time-domain complex transversal filter with controlled weighting coefficients and an intertap interval equal to the Baud period (reciprocal of transmission rate) and receiving on respective inputs the real and imaginary parts of complex symbols output by the coder of the transmitter, with which it is synchronised, a modulator receiving two carriers in phase quadrature and on respective inputs the signals from respective outputs of the complex transversal filter, a subtractor providing the receiver input signal by subtracting the received signal from the modulator output signal, and a demodulator and decision circuit in the receiver providing an error signal controlling the transversal filter weighting coefficients.

Digital implementation of the transversal filter is considerably facilitated by the restricted number of digits needed to encode the real and imaginary parts of the complex symbols constituting its input signal. The price to be paid is the use of a modulator and, above all, the need to synchronise the transmitter and receiver of the terminal incorporating the echo canceller. Synchronisation is required because the synthesised copy echo signal is incomplete, being valid only at those times at which the complex symbols appear at the output of the transmitter code. The Baud period adopted for the transversal filer intertap interval exceeds the Nyquist interval for the real and imaginary parts of the complex signals after shaping.

To eliminate the need to synchronise the transmitter and receiver of a terminal, it has been proposed that the transversal filter intertap interval should be a submultiple of the Baud period less than the Nyquist interval for the transmitted signal, that null complex signals should be applied to the input of the transversal filter at those times when complex symbols appear at the coder output, and that a demodulator independent of the receiver demodulator should be used to generate the error signal used to control the transversal filter weighting coefficients. This makes it possible to synthesise a complete copy of the echo signal, but at the price of using a demodulator separate to that of the receiver and increasing the rate at which operations must be carried out in a digital implementation of the circuit.

SUMMARY OF THE INVENTION

Preferred embodiments of the invention provide an echo canceller requiring no synchronisation between the transmitter and receiver of the terminal in which it is incorporated and which lends itself to less complex digital implementation.

The present invention consists in an adaptive echo canceller for full-duplex synchronous data transmission on a modulated carrier between terminals each comprising a transmitter and a receiver, the transmitter comprising a coder converting the stream of data to be transmitted into a stream of pairs of multivalent real symbols separated by one Baud period, each pair of multivalent real symbols defining the real and imaginary parts of a single complex symbol, and a modulator using a carrier frequency $f_c$ to transpose the complex symbols at the output from the coder into the passband, the echo canceller being connected in one terminal between the output of the coder of the transmitter and the input of the receiver, wherein the canceller comprises:

a time-domain complex transversal filter with controlled weighting coefficients and an intertap interval T which is a submultiple l of the Baud period $\Delta$, receiving on respective inputs the real and imaginary parts of a stream of complex symbols at a transmission rate $1/\Delta$ comprising the complex symbols delivered by the coder of the transmitter at a rate of $1/\Delta$ interleaved with $1-1$ null symbols, and providing the real and imaginary parts of a complex output signal at respective outputs at a samphing rate $1/\Delta$.

a digital modulator connected to the output of the digital complex transversal filter receiving the carrier frequency $f_c$ of the modulator of the transmitter with instantaneous values updated once every Baud period $\Delta$;

a circuit subtracting the output signal of the digital modulator from the received signal to provide the input signal to the receiver; and a digital demodulator receiving the input signal to the receiver in digital form and the carrier frequency $f_c$ of the modulator of the transmitter with instantaneous values updated once every Baud period $\Delta$, and providing an output signal which is used to control the weighting coefficients of the complex transversal filter.

The implementation of the aforementioned adaptive echo canceller is particularly simple in the case of transmission equipment for which the product of the modulation carrier frequency and the modulation rate is an odd multiple of $\frac{1}{4}$, the carrier frequency being synchronised with the modulation rate. This applies to transmission equipment constructed to certain international standards, including CCITT recommendations V26 and V26 bis. Under these circumstances there are four possible instantaneous values of the modulation carrier phase between Baud periods 0, $\pi2$, $\pi$, $3\pi/2$. As a result, the digital modulator and demodulator may be implemented using select circuits and change of sign circuits, eliminating the need to use expensive multiplier circuits.

This simplification of the digital modulator and demodulator also results in simplification of the digital complex filter, which no longer needs to output the real and imaginary parts of its complex output simultaneously, but may output them alternately. If the ratio of the modulation carrier frequency to the transmission equipment modulation rate is a multiple of $\frac{1}{2}$, it is not even necessary to use the imaginary part.

Embodiments of the invention are described by way of example with reference to the accompanying drawings.

DESCRIPTION OF PREFERRED EMBODIMENTS

Before proceeding to describe the invention, it is useful to summarise the characteristics of the echo signal and of the signal transmitted over the transmission line, from which the echo signal is derived.

To a first approximation, a baseband transmission channel may be regarded as a lowpass filter. Nyquist has shown that the the transmission rate through an ideal lowpass filter cannot exceed two data pulses/Hz of the passband, and that this theoretical limit can be approached in practice by a transmission channel seen by the data pulses as a lowpass filter with progressive roll-off and linear phase characteristic. For this reason, in high data rate transmission equipments the transmission rate is reduced by substituting multivalent data symbols for the binary data and by approximating the transmission link specifications to those of a lowpass filter with progressive roll-off and linear phase characteristic by appropriately shaping the symbols, partly on transmission and partly on reception, to minimise noise.

Most transmission paths are more like bandpass filters, however. For this reason, it is common to use a modulation technique to implement frequency transposition of the shaped symbols. In most cases, the technique is derived from amplitude modulation of two carriers in phase quadrature, since the bandwidth occupancy must not be increased. This technique requires the use of paired multivalent data symbols as transmission is effected over two independent channels in phase quadrature.

Figure 1:
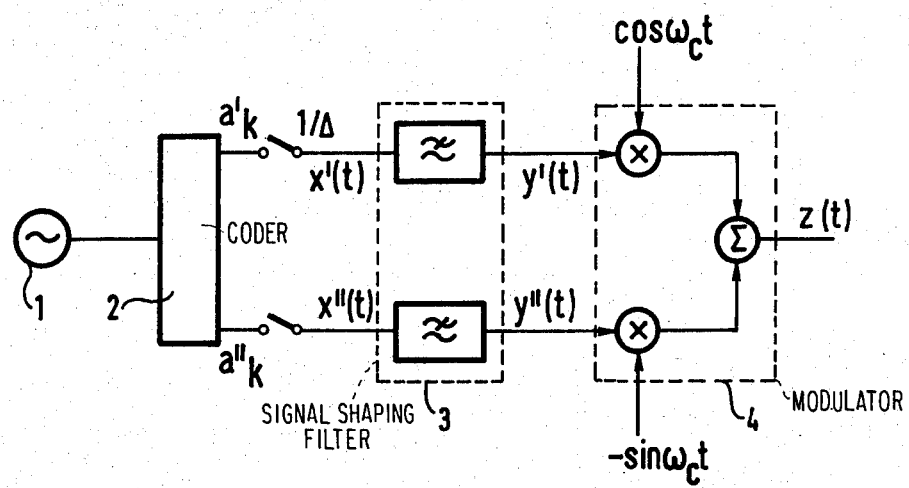
FIG. 1 is an electrical schematic diagram which shows a synchronous data transmitter operating by amplitude modulation of two carriers in phase quadrature.

FIG. 1 shows the principal components of a carrier modulation data transmitter. A source 1 of binary data to be transmitted is connected to a coder 2, a two-channel signal shaping filter 3 and a modulator 4 receiving two carriers in phase quadrature.

Coder 2 converts the binary data from source 1 into a string of pairs of multivalent data symbols $a'_k$, $a''_k$ in binary form on parallel outputs at a rate $1/\Delta$, where $\Delta$ is the Baud period and k is an index identifying time k $\Delta$ at which the pair of symbols $a'_k$, $a''_k$ appears at the coder output.

The signal-shaping filter 3 comprises two identical filter circuits, which may be implemented digitally. They are connected in parallel to the outputs of coder 2 through a sampling circuit operating at the rate $1/\Delta$, receiving input signals $x'(t)$ and $x''(t)$ from the sampling circuit. Its impulse response is represented by $h(t)$.

$$x'(t) = \sum_{k=\infty}^{+\infty} a'_k \delta(t - k\Delta)$$

$$x''(t) = \sum_{k=-\infty}^{+\infty} a''_k \delta(t - k\Delta)$$

In the above equation, $\delta$ is Dirac's pulse. The filter outputs signals $y'(t)$ and $y''(t)$:

$$y'(t) = x'(t)*h(t) = \sum_{k=-\infty}^{+\infty} a'_k h(t - \Delta k)$$

$$y''(t) = x''(t)*h(t) = \sum_{h=-\infty}^{+\infty} a''_k h(t - \Delta k)$$

In the above equation, the symbol * indicates the convolution operation.

Modulator 4 receives two carriers in phase quadrature at angular frequency $\omega_c$. It outputs to the transmission line signal $z(t)$:

$$z(t) = y'(t) \cos \omega_c t - y''(t) \sin \omega_c t$$

Using complex notation:

$$a_k = a'_k + i a''_k$$

$$x(t) = x'(t) + i x''(t)$$

$$y(t) = y'(t) + i y''(t)$$

which is justified since transmission is effected on two independent channels in phase quadrature, the transmitted signal $z(t)$ may be written:

$$z(t) = Re\,[(x(t)*h(t))e^{i\omega_c t}]$$

or:

$$z(t) = Re\left[e^{i\omega_c t} \sum_{k=-\infty}^{+\infty} a_k h(t - \Delta k)\right]$$

Figure 2:
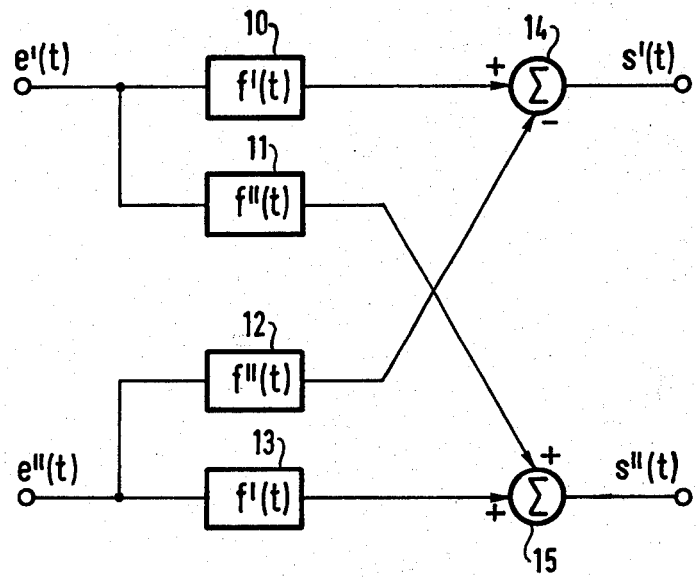
FIG. 2 is an electrical schematic diagram which shows a complex transversal filter.

This notation is related to the use of the concept of a complex filter, which processes complex signals and is defined by a complex impulse response. FIG. 2 shows one method of implementing a complex filter based on this definition. The complex filter is assumed to have a complex impulse response $f(t)$ with real part $f'(t)$ and imaginary part $f''(t)$, a complex input signal $e(t)$ with real part $e'(t)$ and imaginary part $e''(t)$, and a complex output signal $s(t)$ with real part $s'(t)$ and imaginary part $s''(t)$. It comprises four real filters 10, 11, 12 and 13 and summing circuits 14 and 15. The impulse response of real filters 10 and 13 is $f'(t)$. That of filters 11 and 12 is $f''(t)$. The inputs of real filters 10 and 11 are connected in parallel and receive real signal $e'(t)$. The inputs of real filters 12 and 13 are connected in parallel and receive imaginary signal $e''(t)$. Summing circuit 15 adds the output signals of real filters 11 and 13 to provide the imaginary output signal $s''(t)$. Summing circuit 14 has a subtracting input and subtracts the output signal of real filter 12 from that of real filter 10 to provide the real output signal $s'(t)$. We may write:

$$s'(t) = e'(t)*f'(t) - e''(t)*f''(t)$$

$$s''(t) = e''(t)*f'(t) + e'(t)*f''(t)$$

or in complex notation:

$$s(t) = e(t)*f(t)$$

Signal shaping filter 3 of the data transmitter is a complex filter with real impulse response $h(t)$.

It is assumed that the system is linear and that the echo $r(t)$ at the input to the receiver of a transmission terminal may be regarded as having been obtained from the transmitter of the same terminal through a filter with impulse response $u(t)$:

$$r(t) = z(t)*u(t)$$

In echo cancellers which connect to the output of the transmitter, this real impulse response is synthesised using a real transversal filter whose weighting coefficients are controlled in accordance with the correlation between the signals available at the transversal filter taps and the receiver input signal.

Expressing signal $z(t)$ in the previous equation as a function of the signal $x(t)$ obtained by sampling the coder output we obtain the following expression for the echo signal:

$$r(t) = Re[(x(t)*h(t))e^{i\omega_c t}]*u(t)$$

This may also be written:

$$r(t) = Re[(x(t)*h(t)*(u(t)e^{-i\omega_c t}))e^{i\omega_c t}]$$

If we define the complex impulse response $g(t)$ by the equation:

$$g(t) = h(t)*u(t)e^{-i\omega_c t} \tag{1}$$

we obtain:

$$r(t) = Re[x(t)*g(t)e^{i\omega_c t}]$$

or, by writing:

$$R(t) = x(t)*g(t)$$

$$r(t) = Re[R(t)e^{i\omega_c t}] \tag{2}$$

Equation (2) shows that the passband echo $r(t)$ may be considered as the result of modulating a complex echo in the baseband $R(t)$ from the coder using a filter with complex impulse response $g(t)$. This baseband echo signal $r(t)$ may be expressed as a function of the complex symbols $a_k$ from the coder:

$$R(t) = \sum_{k=-\infty}^{+\infty} a_k g(t - k\Delta) \tag{3}$$

At sampling times $j\Delta$ this baseband echo may be written:

$$R(j\Delta) = \sum_{k=-\infty}^{+\infty} a_k g(j\Delta - k\Delta) = \sum_{n=-\infty}^{+\infty} a_{j+n} g(-n\Delta)$$

This last equation is that for the output signal of a complex transversal filter whose complex weighting coefficients are samples g(−nΔ) of the complex impulse response g(t) with an intertap interval equal to the Baud period and multivalent complex symbols $a_k$ as input signal. This is why certain prior art echo cancellers use a complex transversal filter with intertap interval equal to a Baud period, operating on complex symbols obtained by the coder to generate all Baud periods of a complex baseband echo copy signal. Digital modulation is then used to transpose the sampled baseband echo copy signal to provide a sampled passband echo copy signal. The weighting coefficients of the complex transversal filter are controlled on the basis of the correlation between the signals at the transversal filter taps and the previously demodulated receiver input signal. For a more detailed description of this type of echo canceller refer to the article by K. H. Mueller "A New Digital Echo Canceller for two-wire Full-duplex Data Transmission", IEE Trans. on Com. Vol. Com. 24 No 9 September 1976 p. 956–962.

In practice, a complex transversal filter with intertap interval equal to a Baud period is not able to fully synthesise the complex impulse response g(t) as the bandwidth of such a response is only limited (see equation 1) by that of the signal-shaping filter 3, which generally has a roll-off characteristic (Nyquist interval below a certain percentage of the Baud period). It follows that the echo copy signal is only valid at times jΔ, so that the transmitter and receiver of the data transmission terminal equipment must be synchronised.

To circumvent this problem it has already been proposed to use a complex transversal filter with controlled weighting coefficients and intertap interval equal to a submultiple of the Baud period and less than the Nyquist interval for the transmitter output signal.

If this submultiple is l and T is the intertap interval:

$$lT = \Delta$$

The baseband echo samples R(jT) may be expressed as follows (equation 3):

$$R(jT) = \sum_{k=-\infty}^{+\infty} a_k g(jT - \Delta k)$$

By defining a new set of complex symbols $b_{kl+m}$:

$$0 \leq m < l \text{ and } b_{kl+m} \begin{cases} a_k & m = 0 \\ 0 & m \neq 0 \end{cases}$$

By positing integers p and q such that:

$$j = pl + q \quad 0 < q \leq l$$

and noting that the product:

$$b_{kl+q-m} g(mT + p\Delta - k\Delta)$$

is null if m≠q and equal to:

$$a_k g(jT - k\Delta)$$

for m=q, the baseband echo samples R(jT) may be written:

$$R(jT) = \sum_{k=-\infty}^{+\infty} \left[ \sum_{m=0}^{l-1} b_{kl+q-m} g(mT + p\Delta - k\Delta) \right]$$

Changing the summation signs and replacing index k with index k′ where k′=k−p:

$$R(jT) = \sum_{m=0}^{l-1} \left[ \sum_{k'=-\infty}^{+\infty} b_{j+k'l-m} g(mT - k'\Delta) \right] \quad (5)$$

This equation may be rewritten by adopting a new index n where n=k′l−m (n varies between −∞ and +∞ and k′ is the smallest integer greater than or equal to n/l):

$$R(jT) = \sum_{n=-\infty}^{+\infty} b_{j+n} g(-nT)$$

This equation is also that for the output signal of a digital complex transversal filter whose weighting coefficients are the samples g(−nT) at intervals t (lth submultiple of the Baud period) of the complex impulse response g(t) and receiving as input signal the multivalent complex symbols $a_k$ from the coder interleaved with l−1 null symbols.

Equation 5 shows that the baseband echo samples R(jT) may also be regarded as the sum of the output signals of a bank of l digital complex transversal filters with as weighting coefficients the samples g(mT−k′Δ) at intervals of the Baud period of the complex impulse response g(t), and receiving as input signal the multivalent complex symbols $a_k$ from the coder, operating with out-of-phase clocks with interleaved coefficient vectors.

The complex samples of the baseband echo copy signal obtained at the output of the filter or bank of transversal filters at a rate l times the modulation rate (reciprocal of the Baud period) are transposed into the passband by a digital modulator receiving two carriers in phase quadrature using the instantaneous value of the transmission carrier updated at intervals T (lth submultiple of the Baud period). The weighting coefficients of the filter or filter bank are controlled on the basis of the correlation between the complex samples available at the taps of the filter or filter bank and those of the previously demodulated receiver input signal, according to a gradient algorithm. For further details, refer to the article by S. B. Weinstein "A Passband Data-driven Echo Canceller for Full-duplex Transmission on Two-wire Circuits", IEE Trans. on Com. Vol. Com 25 No 7 July 1977 pages 654–666.

As compared with the previous type of echo canceller, this type has the disadvantage of increasing the rate at which operations must be executed in the transversal filter, the modulator transposing the echo copy signal into the passband and the demodulator transposing the receiver input signal into the baseband for controlling the weighting coefficients of the filter or filter bank.

In the echo canceller in accordance with the invention, this disadvantage is restricted to the digital modulator and demodulator by reducing the update frequency at the modulation rate to the instantaneous carrier frequency.

The passband echo r(t) may be written (equations 2 and 3):

$$r(t) = Re\left[ e^{i\omega_c t} \sum_{k=-\infty}^{+\infty} a_k g(t - k\Delta) \right]$$

Its samples at times jT may be written:

$$r(jT) = Re\left[ e^{i\omega_c jT} \sum_{k=-\infty}^{+\infty} a_k g(jT - k\Delta) \right]$$

Using integers p and q defined previously:

$$j = pl + q \quad 0 \leq q < l \quad lT = \Delta \quad (6)$$

$$r(jT) = Re\left[ e^{i\omega_c p\Delta} \sum_{k=-\infty}^{+\infty} a_k g(jT - k\Delta) e^{i\omega_c qT} \right]$$

Using the complex symbols $b_{kl+m}$ defined above and noting that the product:

$$b_{kl+q-m} g(p\Delta + mT - k\Delta) e^{i\omega_c mT}$$

where m is an integer varying between 0 and l−1 is null for m≠q and equal to:

$$a_k g(jT - k\Delta) e^{i\omega_c mT}$$

for m=q, the term W(jT) in equation (6) may be rewritten:

$$W(jT) = \sum_{k=-\infty}^{+\infty} \sum_{m=0}^{l-1} b_{kl+q-m} g(p\Delta + mT - k\Delta) e^{i\omega_c mT}$$

Exchanging the summation signs and replacing index k with index k' where k'=k−p:

$$W(jT) = \sum_{m=0}^{l-1} \sum_{k'=-\infty}^{+\infty} b_{j+k'l-m} g(mT - k'\Delta) e^{i\omega_c mT} \quad (7)$$

or using the new index n where n=k'l−m:

$$W(jT) = \sum_{n=-\infty}^{+\infty} b_{j+n} g(-nT) e^{i\omega_c(k'l-n)T} \quad (8)$$

in which k' is the largest integer less than or equal to n/l.

Equation 8 is that for the output signal of a complex transversal filter with as weighting coefficients the samples g(−nT) at intervals T and phase-shifted by $\omega_c(k'l-n)T$ of the complex impulse response g(t), receiving as input signal the multivalent complex symbols $a_k$ from the coder interleaved with l−1 null symbols.

Equation 7 is that for the sum of the output signals of a bank of l complex transversal filters having as weighting coefficients the samples g(mT−k'Δ) at intervals of the Baud period Δ and phase-shifted by $\omega_c mT$ of the complex impulse response g(t) receiving as input signal and multivalent complex symbols $a_k$ from the coder, operating with out-of-phase clocks with interleaved coefficient vectors.

As the complex impulse response g(t) is of limited duration, a digital transversal filter or filter bank may be used to generate signal W(jT) and to derive therefrom the passband echo copy signal using a digital modulator operating with the instantaneous transmission carrier frequency updated at intervals of the Baud period. This is of great benefit when the possible instantaneous values of the transmission carrier at the end of each Baud period are limited in number and may be coded using a small number of digits. For this to be the case, the product of the modulation frequency and the Baud period must be a ratio of two integers. Of particular advantage is the case in which this product is a multiple of ¼. Assuming $f_c\Delta = R/4$ where R is an integer, we may write:

$$e^{i\omega_c p} = e^{i\left(\frac{2\pi R}{4}\right)p} = (i)^{Rp}$$

The passband echo samples r(jT) may then be written:

$$r(jT) = Re[(i)^{Rp} W(jT)]$$

The modulation operation amounts, at each time jT, to multiplying the complex quantity W(jT) by the coefficient $(i)^{Rp}$. This amounts to selecting the real or imaginary part of the complex quantity W(jT), with or without or negative sign. Similarly, demodulation amounts to multiplying by the quantity $(-i)^{Rp}$. This has the further advantage of halving the number of operations required to compute the quantity W(jT), as modulation requires only alternate (not simultaneous) knowledge of the real and imaginary parts of quantity W(jT).

Figure 3:
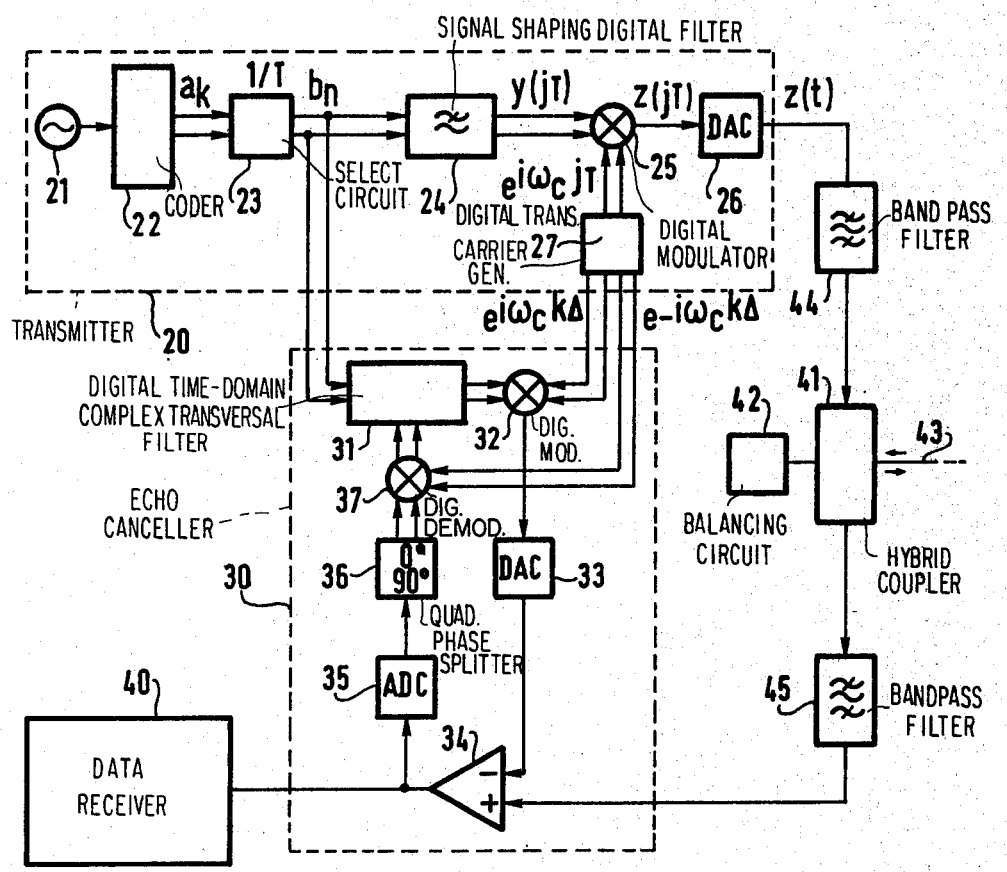
FIGS. 3, 4 and 5 are further electrical schematic diagrams showing three examples of full-duplex carrier modulation synchronous data transmission terminals incorporating an adaptive echo canceller in accordance with the invention.

FIG. 3 shows a data transmission terminal equipment incorporating an echo canceller in accordance with the invention. It comprises transmitter 20, echo canceller 30, receiver 40 and hybrid coupler 41.

Transmitter 20 basically comprises:

a source 21 of binary data to be transmitted;

a coder 22 converting the data from source 21 into a stream of multivalent complex symbols $a_k$ at a rate 1/Δ (reciprocal of the Baud period), providing the real and imaginary parts of said symbols in binary form on respective parallel outputs;

a select circuit 23 connected to the outputs of coder 22 to convert the stream of multivalent complex symbols $a_k$ into a stream of multivalent symbols $b_n$ at a data rate increased by a factor of l, where l is selected so that the frequency 1/Δ is greater than twice the maximum frequency of the signals transmitted in the passband. The stream of multivalent complex symbols $b_n$ is defined as follows, where k and m are integers such that:

$$n = kl + m \quad 0 \leq m < l$$

$$b_n = \begin{cases} a_k & m = 0 \\ 0 & m \neq 0 \end{cases}$$

a complex signal-shaping digital filter 24 with real impulse response h(t) connected to the outputs of select circuit 23 and providing at its output at rate 1/Δ the complex digital sample y(jT):

$$y(jT) = \sum_{k=-\infty}^{+\infty} a_k h(jT - k\Delta)$$

a digital modulator 25 receiving two carriers in phrase quadrature at frequency $f_c$, connected to the output of the signal-shaping filter and operating at a rate 1/Δ to output the real digital samples z(jT):

$$z(jT) = Re[y(jT)e^{i\omega_c T}]$$

a digital-analogue converter (DAC) 26 connected to the output of digital modulator 25 to generate the passband transmission signal z(t); and a digital transmission carrier generator 27 providing at the rate $1/\Delta$ instantaneous values $e^{i\omega_c jt}$ for digital modulator 25 and at the rate $1/\Delta$ instantaneous values $e^{i\omega_c k\Delta}$, $e^{-i\omega_c k\Delta}$ for echo canceller 30.

The data receiver 40 is not shown in detail as it is of conventional design and not relevant to understanding the operation of echo canceller 30.

Hybrid coupler 41 uses a balancing circuit 42 such as a differential transformer. It has an input/output terminal connected to transmission channel 43, an input terminal connected to the output of data transmitter 20 through bandpass filter 44, and an output terminal connected to the input of data receiver 40 through passband filter 45 and subtracting circuit 34 of echo canceller 30.

The echo canceller principally comprises:

a digital time-domain complex transversal filter 31 with controlled weighting coefficients and intertap interval $\Delta/1$, receiving at its input the stream of multivalent complex symbols $b_n$ from select circuit 23 and generating at its output at a rate $1/\Delta$ samples $W'(jT)$ of a complex signal;

a digital modulator 32 receiving two carriers in phase quadrature and operating at rate $1/\Delta$, receiving samples $W'(jT)$ from digital complex transversal filter 31 and the instantaneous values $e^{i\omega_c k\Delta}$ of the transmission carrier from the digital carrier generator 27, outputting at rate $1/\Delta$ samples $r'(jT)$ of a passband echo copy signal defined by the equation:

$$r'(jT) = Re[W'(jT)e^{i\omega_c k\Delta}]$$

a digital-analogue converter (DAC) 33 connected to the output of digital modulator 32 providing the passband echo copy signal;

a subtracting circuit 34 receiving on an add input the signal from the receive output terminal of hybrid coupler 41 through bandpass filter 45 and on a subtract input the passband echo copy signal r'(t) from digital-analogue converter 33, outputting the input signal to data receiver 40;

an analogue-digital converter (ADC) 35 connected to the output of the subtracting circuit and supplying at rate $1/\Delta$ samples $Re(e'(jT))$ of a signal used to control the weighting coefficients of digital complex transversal filter 31;

a quadrature phase splitter 36 connected on the output side of analogue-digital converter 35 to output complex samples $e'(jT)$ of the corresponding analytical signal; and a digital complex demodulator 37 receiving the analytical signal sample $e'(jT)$ and the instantaneous values $e^{-i\omega_c k\Delta}$ of the transmission carrier from carrier generator 27, outputting at rate $1/\Delta$ samples of an analytical signal used to control the weighting coefficients of digital complex transversal filter 31.

As has already been shown, the passband echo signal may be considered as derived from a digital complex transversal filter with intertap interval $1/\Delta$ producing complex samples $W(jT)$ subsequently modulated by the complex instantaneous values $e^{i\omega_c k\Delta}$ of the transmission carrier. If $D_j$ is the vector whose components at jT are the weighting coefficients $d_j^p, -d_j^{-n}$ of this filter and $C_j$ if the vector whose components at jT are the weighting coefficients $C_j^p, -C_j^{-n}$ of digital complex transversal filter 31 and $B_j$ if the vector whose components at jT are the complex symbols $b_j, -b_{j+n}$ in the delay line of digital complex transversal filter 31, the complex error derived from the passband echo sample $r(jT)$ and the passband echo copy sample $r'(jT)$ may be written:

$$e(jT) = {}^TB_j(D_j - C_j)e^{i\omega_c p\Delta}$$

where $j = pl + q$ and $0 \leq q < 1$ and ${}^TB_j$ is the transposition of vector $B_j$.

The square of this error is a convex function of the real and imaginary parts of the components of vector $C_j$. It may therefore be minimised by modifying vector $C_j$ using a gradient algorithm of the form:

$$C_{j+1} = C_j - \alpha \text{grad}|e_j e_j^*|$$

In the above equation, $\alpha$ is a positive constant and the asterisk denotes a conjugate complex term.

Since:

$$\frac{\partial |e(jT)e^*(jT)|}{\partial C_j^n} = -2e(jT)b_{j+n}^* e^{-i\omega_c p\Delta}$$

we have:

$$|e(jT) \cdot e^*(jT)| = -2e(jT)B_j^* e^{-i\omega_c p\Delta}$$

The algorithm used to obtain convergence of the passband echo copy with the passband echo is therefore of the form:

$$C_{j+1} = C_j + \beta e(jT)B_j^* e^{-i\omega_c p\Delta}$$

In the above equation, $\beta$ is a positive constant.

As most components of vector $B_j^*$ are null, this algorithm is not able to modify all components of vector $C_j$ at times jT. By definition, the non-null complex symbols $b_{j+n}$ are those whose index is equal to zero (modulo l):

$$j + n \equiv 0 \text{ modulo } l$$

If R is the largest integer such that:

$$Rl - q \leq N$$

these components may be written: $b_{j+l-q}$, $b_{j+2l-q}, -b_{j+Rl-q}$ and only components $C_j^{q-l}$, $C_j^{q-2l}, -C_j^{q-Rl}$ of vector $C_j$ are modified by the algorithm at time jT. If $(C_q)j$ is the vector defined by these components:

$${}^T(C_q)j = [C_j^{q-l}, -C_j^{q-Rl}]$$

The previous algorithm may be written:

$$(C_q)_{j+1} = (C_q)_j + \beta e(jT)B^* e^{i\omega_c p\Delta}$$

As the components of vector $C_q$ are not usable by the digital complex transversal filter between times jT and $(j+1)T$, the complex symbols by which they are multipled being null in this interval, it is sufficient to implement the algorithm over one Baud period. The algorithm is therefore written:

$$(C_q)_{p+1} = (C_q)_p + \beta e(p\Delta + qT)B_{pl+q}^* e^{i\omega_c p\Delta}$$

The subdivision of vector $C_j$ into the set of l vectors $(C_q)j$ corresponds to the subdivision of digital transversal filter 31 with intertap intervals $\Delta/l$ into a set of l transversal filters with intertap intervals $\Delta$. The possibility of doing this has already been discussed.

The complex error $e(jT)$ is not available explicitly, but is included in the analytical signal $e'(jT)$ corresponding to the output signal of subtractor 34. In terms of average value, it may be replaced by this analytical signal obtained from the quadrature phase splitter 36, insofar as the other components of the analytical signal are not correlated with it and the mathematical expectation of the complex symbols $a_k$ from the transmitter has a constant null value. These conditions are complied with in practice.

Digital complex demodulator 37 multiplies analytical signal $e'(jT)$ by the complex instantaneous value $e^{-i\omega_c p\Delta}$ updated at intervals of one Baud period to permit subsequent use of the algorithm for controlling the weighting coefficients of digital complex transversal filter 31.

As an alternative, it is possible to use only the real part of the error signal, in other words samples Re $e'(jT)$ of the input signal of data receiver 40. This reduces the rate at which the coefficients converge, and the algorithm is written:

$$(C_q)_{p+1} = (C_q)_p \beta Re[e'(p\Delta + qT)] B_{pl+q}^* e^{-i\omega_c p\Delta}$$

This eliminates the need for the quadrature phase splitter and reduces the number of operations to be carried out. It is even possible to use only the sign of the real part of the error signal, so that the algorithm is written:

$$(C_q)_{p+1} = (C_q)_p + \beta \text{sign} \\ (Re[e'(p\Delta + qT)]) B_{pl+q}^* e^{-\omega_c p\Delta}$$

Figure 4:
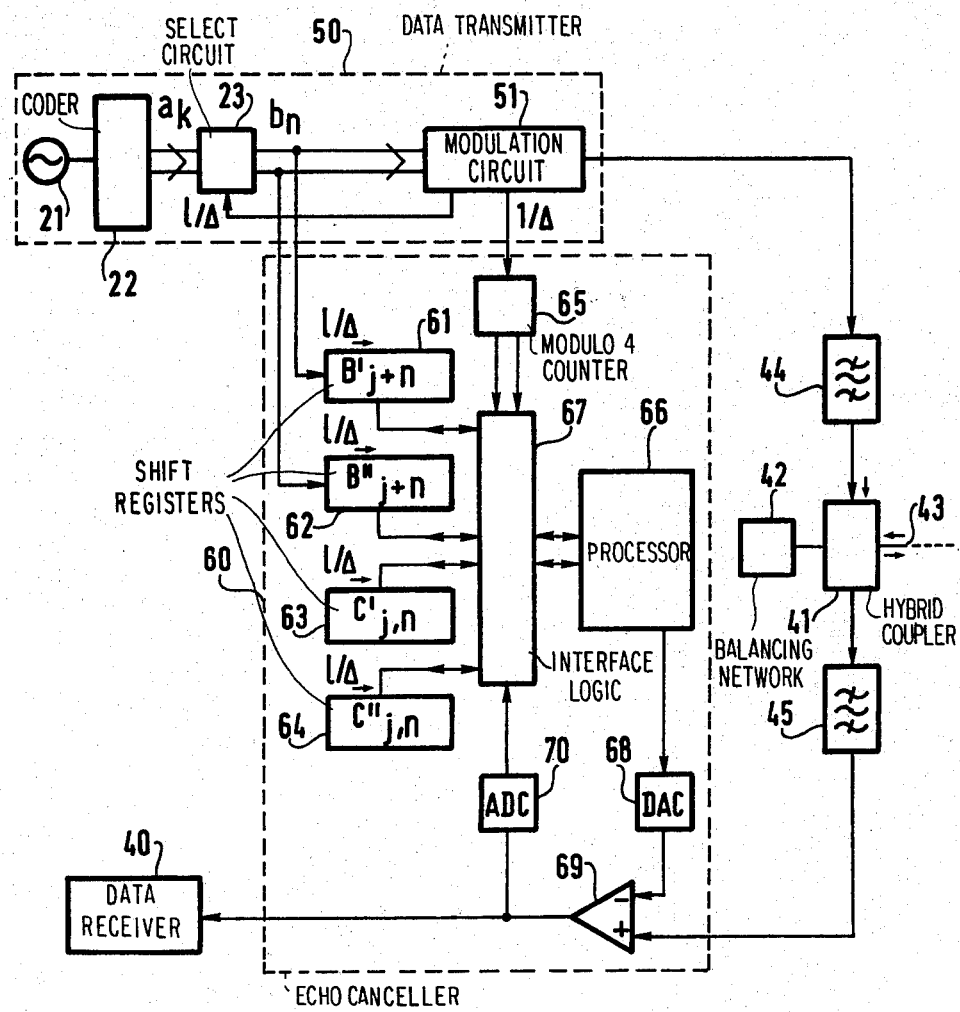

FIG. 4 shows a duplex data transmission terminal equipment using a modulation frequency $f_c$ related to the Baud period $\Delta$ by the equation $f_c\Delta = s/4$, in which s is an odd integer. The equipment incorporates an echo canceller in accordance with the invention.

The data transmitter 50 is of similar design to that of the terminal transmitter shown in FIG. 3, but is shown in less detail. The source 21 of binary data to be transmitted is connected to a coder 22 converting this data into a stream of complex symbols $a_k$ at a rate $1/\Delta$ (reciprocal of Baud period) and a select circuit 23 converting the stream of complex symbols $a_k$ to a stream of complex symbols $b_n$ at a rate l times higher, as defined by the relations:

$$n = kl + m \quad 0 \leq m < l$$

$$B_n = \begin{cases} a_k & m = 0 \\ 0 & m \neq 0 \end{cases}$$

The real and imaginary parts are available in binary form at respective parallel outputs. Data transmitter 50 further comprises a signal-shaping and modulation circuit 51 generating the signals output to the transmission line.

Transmission channel 43 is connected to the terminal by a hybrid coupler 41 loaded by a balancing network 42. Data transmitter 50 is connected to an input terminal of hybrid coupler 41 through bandpass filter 44. Data receiver 40 is connected to an output terminal of hybrid coupler 41 through bandpass filter 45 and subtractor 69 of echo canceller 60.

Echo canceller 60 comprises four shift registers 61, 62, 63 and 64 clocked on by one bit at intervals $\Delta/l$, processor 66 connected by interface logic 67 to shift registers 61 to 64, modulo 4 counter 65 controlling the interface logic, digital-analogue converter (DAC) 68 connected to the processor output, subtractor 69 whose subtract input is connected to the output of digital-analogue converter 68, and analogue-digital converter (ADC) 70 connected between the output of subtractor 69 and interface logic 67.

Shift register 61 receives the real part $b'_j$ and shift register 62 receives the imaginary part $b''_j$ of complex symbol $b_j$ output at rate $1/\Delta$ by select circuit 23 of data transmitter 50. At time $jT$ register 61 contains the real part $B'_j$ and register 62 contains the imaginary part $B''_j$ of the previously defined vector $B_j$. At time $jT$ register 63 contains the components of the real part $C'_j$ of vector $C_j$ of the weighting coefficients of the digital transversal filter and register 64 contains the components of the imaginary part $C''_j$ of the same vector.

At time $jT$ the echo canceller synthesises the passband echo copy signal:

$$r'(jT) = Re[{}^tB_j C_j e^{i\omega_c p\Delta}]$$

In the above equation, p is the largest integer less than or equal to $j/l$. The echo canceller updates the components of vector $C_j$ by means of a gradient algorithm. Because of the correlation between the carrier frequency $f_c$ and the Baud period $\Delta(4f_c\Delta = s)$, we may write:

$$e^{i\omega_c p} = e^{i(\pi/2)sp} = (i)^{sp}$$

The echo copy signal may therefore be expressed:

$$r'(jT) = Re[{}^TB_j C_j (i)^{sp}]$$

This has only four possible values, according to the value of index p:
$${}^TB'_j C'_j - {}^TB''_j C''_j \text{ if } sp \equiv 0 \text{ modulo } 4$$
$$-{}^TB''_j C'_j - {}^TB_j C''_j \text{ if } sp \equiv 1 \text{ modulo } 4$$
$$-{}^TB'_j C'_j + {}^TB_j C''_j \text{ if } sp \equiv 2 \text{ modulo } 4$$
$${}^TB''_j C'_j + {}^TB'_j C''_j \text{ if } sp \equiv 3 \text{ modulo } 4$$

Counter 65 is clocked by data transmitter 50 at rate $1/\Delta$ and indicates the modulo 4 value of sp to interface logic 67, which controls the computation carried out by processor 66.

Assume, by way of example, that counter 65 indicates the value of sp is 2 modulo 4. Interface logic 67 transfers the contents $B'_j$ and $C'_j$ of registers 61 and 63 to processor 66 which derives the scalar product ${}^TB'_j C'_j$, for example by multiplying successively the content of bits of the same rank in registers 61 and 63 and subtracting the result in an accumulator previously set to zero. When the scalar product has been derived, interface logic 67 transfers the contents $B''_j$ and $C''_j$ of registers 62 and 64 to processor 66 which derives their scalar product, for example by using the previous accumulator not reset to zero. The final result is the echo copy signal at time $jT$. It is transferred to digital-analogue converter 68 and subtracted from the receive signal by hybrid coupler 41. The difference between the signal received through hybrid coupler 41 and the echo copy signal is converted by analogue-digital converter 70 to digital signal $Re[e'(jT)]$ which is sent to interface logic 67 to update part, subset $(C_q)_j$, of the vector of the complex transversal coefficients, using a gradient algorithm of the form:

$$(C_q)_{p+1} = (C_q)_p + \beta Re[e'(p\Delta + qT)] \cdot B_p^* {}_{l+q}(-i)^{sp}$$

or:

$$(C_q)_{p+1} = (C_q)_p + \beta \, sign Re[e'(p\Delta + qT)] B_p^* {}_{l+q}(-i)^{sp}$$

The real and imaginary parts of each component of vector $C_q$ are updated preferentially during computation of the echo copy signal on transfer into processor 66.

As an alternative, a quadrature phase splitter may be inserted upstream or downstream of analogue-digital converter 70 to provide a complex error signal $e'(jT)$, the coefficients being updated by an algorithm of the form:

$$(C_q)_{p+1} = (C_q)_p + \beta e'(jT) \cdot B_p^* {}_{l+q}{}^*(-i)sp$$

Figure 5:
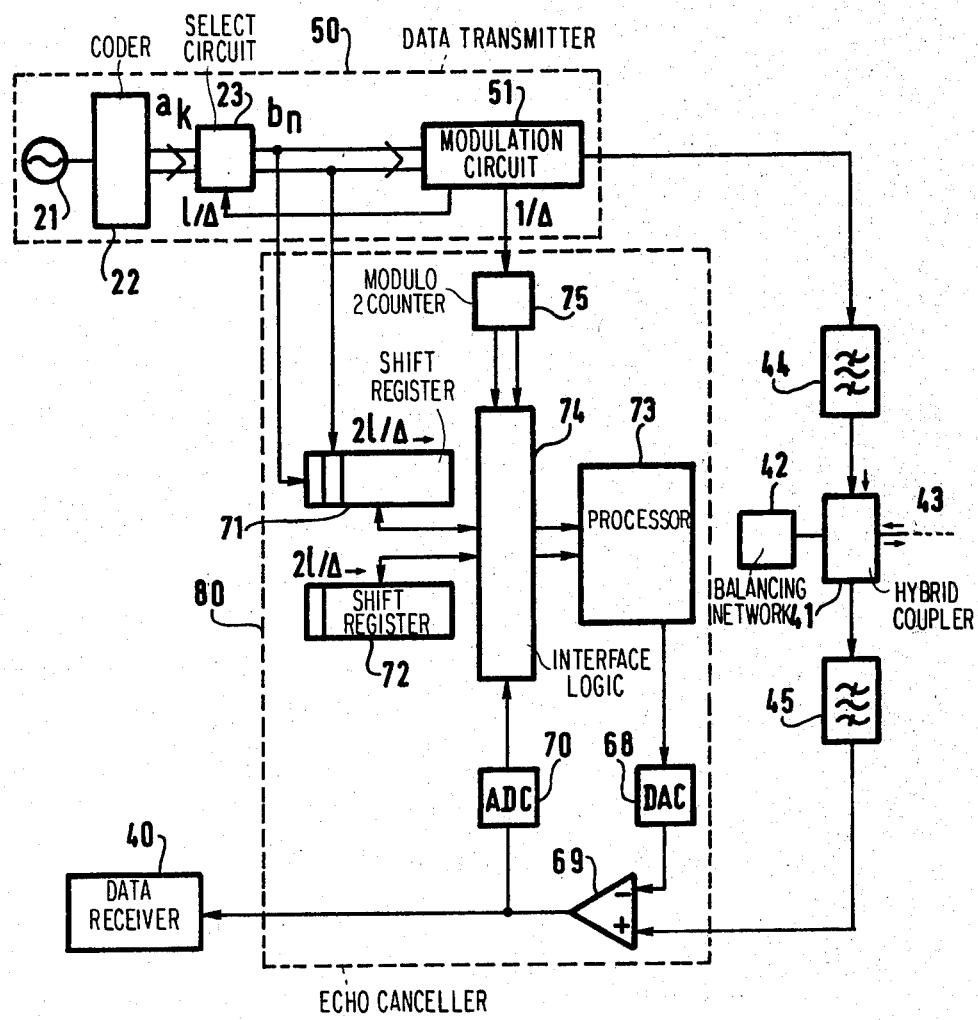

FIG. 5 shows one terminal of a duplex data transmission system using a carrier frequency $f_c$ related to the Baud period by the equation $4f_c\Delta = v$, where v is an integer which is an odd multiple of 2.

This transmission terminal is distinguished from that of FIG. 4 by the design of the echo canceller 80. This comprises shift registers 71 and 72 clocked on by two bits at intervals $\Delta/1$, processor 73 connected by interface logic 74 to registers 71 and 72, modulo 2 counter 75 controlling interface logic 74, digital-analogue converter (DAC) 68 connected to the output of processor 17, subtracting circuit 69 with an add input connected to the receive output terminal of hybrid circuit 41 through bandpass filter 45 and a subtract output connected to the output of digital-analogue converter 68, its input being connected to the input of receiver 40, and analogue-digital converter (ADC) 70 connected between the output of subtracting circuit 69 and interface logic 74.

Echo canceller 80 continuously synthesises the passband echo copy signal:

$$r'(jT) = Re[{}^TB_jC_je^{i\omega_cp\Delta}]$$

It updates the components of vector $C_j$ using a gradient algorithm. Because of the correlation between carrier frequency $f_c$ and the Baud period $(2f_c\Delta = v', v' = v/2$, where $v'$ is odd), we may write:

$$e^{i\omega_cp\Delta}32 \, e^{i\pi(v/2)p} = (-1)^{v'p} = (-1)^p$$

The echo copy signal may be expressed in the form:

$$r'(jT) = (-1)^p Re[{}^TB_jC_j]$$

or, using the real parts $B'_j$, $C'_j$ and imaginary parts $B''_j$, $C''_j$ of vectors $B_j$ and $C_j$:

$$r'(jT) = (-1)^p[{}^TB'_jC'_j - {}^TB''_jC''_j]$$

Shift register 71 has two parallel inputs, one to bit 1 and the other to bit 2. These are connected to the parallel outputs of select circuit 23 of data transmitter 50. At time jT it receives the real part $b'_j$ of the complex symbol on its first input and the imaginary part $b''_j$ of the same symbol on its second input. It is clocked on by two bits at the rate $1/\Delta$.

Shift register 72 holds in its odd-numbered bits the components of the real part $C'_j$ and in its even-numbered bits the components of the imaginary part $C''_j$ of the same vector, with negative sign.

The real and imaginary parts of vectors $B_j$ and $C_j^*$ are therefore interleaved to form the doublelength real vectors ${}_1B_j$ and ${}_1C_j$. Ignoring its sign, the echo copy signal $r'(jT)$ is the scalar product of vectors ${}_1{}^TB_j {}_1C_j$. This facilitates programming interface logic 74 and processor 73.

At time jT interface logic 74 transfers the content of registers 71 and 72 into processor 73, which sums the products of terms of the same rank and applies to the sum the coefficient $(-1)^p$ from modulo 2 counter 75 clocked at rate $1/\Delta$ by data transmitter 50. The sum is then transferred to digital-analogue converter 68 to be subtracted from the received signal by hybrid coupler 41.

The difference between the signal received through hybrid coupler 41 and the baseband echo copy is converted by analogue-digital converter 70 to a digital signal Re $(e'(jT))$ sent to interface logic 74. This also updates the real and imaginary components of vector $C_j^*$ stored in interleaved form in register 72, by applying the conjugate version of the previously mentioned gradient algorithm:

$$(C_q^*)_{p+1} = (C_q^*)_p + \beta e'^*(p\Delta + qT) B_{pl+q} e^{i\omega_cp\Delta}$$

Ignoring the imaginary part of the error signal and since $2f_c\Delta = v'$, this algorithm may be written:

$$(C_q^*)_{p+1} = (C_q^*)_p + (-1)^p\beta Re[e'^*(p\Delta + qT)]B_{pl+p}$$

Using the simplified version:

$$(C_p^*)_{p+1} = (C_q^*)_p + (-1)^p\beta \, sign$$
$$Re[e'^*(p\Delta + qT)]B_{pl+q}$$

As in the previous embodiment of the invention, a quadrature phase splitter may be inserted upstream or downstream of analogue-digital converter 70 to provide complex error signal $e'(jT)$, the coefficients being updated by a gradient algorithm of the form:

$$(C_p^*)_{p+1} = (C_q^*)_p + (-1)^p\beta e'^*(p\Delta + qT) \cdot B_{pl+q}$$

A particularly beneficial application of the above embodiment is to data transmission systems operating at 2 400 bits/s, modulation rate 1 200 bauds and modulation frequency 1 800 Hz, to CCITT V26 and V26 bis recommendations on data transmission systems). In this case, $2f_c\Delta = 3$.

Another beneficial application is to data transmission systems using a carrier frequency $f_c$ related to the Baud period by the equation $f_c\Delta = u$, where u is an integer, since in this case:

$$e^{i\omega_cp\Delta} = e^{i2\pi pu} = 1$$

and no processing is required of the digital modulators and demodulators.

It is possible to replace certain technical means referred to in the above description by equivalent technical means without departing from the scope of the invention. For example, in the embodiments of FIGS. 3, 4 and 5 the echo copy signal and received signal are applied in analogue form to the input of an analogue subtractor (34 in FIG. 3, 69 in FIGS. 4 and 5). This subtraction operation could be implemented digitally, the analogue-digital converters (35 in FIG. 3, 70 in FIGS. 4 and 5) and digital-analogue converters (33 in FIG. 3, 68 in FIGS. 4 and 5) being connected between the output of filter 45 and the + input of the digital subtractor and the input of receiver 40, respectively.

We claim:

1. An adaptive echo canceller for full-duplex synchronous data transmission on a modulated carrier between terminals each comprising a transmitter (20) and a receiver (40), the transmitter (20) comprising a coder (22) converting the stream of data to be transmitted into a stream of pairs of multivalent real symbols ($a'_k$ and $a''_k$) separated by one Baud period $\Delta$, each pair of multivalent real symbols ($a'_k$ and $a''_k$) defining the real and imaginary parts of a single complex symbol ($a_k$), and a modulator (25) using a carrier frequency ($f_c$) to transpose the complex symbols at the output from the coder (22) into the passband, the echo canceller being connected in one terminal between the output of the coder (22) of the transmitter (20) and the input of the receiver (40), wherein the canceller comprises:

a time-domain complex transversal filter (31) with controlled weighting coefficients and intertap interval T which is a submultiple l of the Baud period ($\Delta$), receiving on respective inputs the real and imaginary parts of a stream of complex symbols $b_n$ at a transmission rate $1/\Delta$ comprising the complex symbols $a_k$ delivered from the coder (22) of the transmitter interleaved with $l-1$ null symbols and providing the real and imaginary parts of a complex output signal at respective outputs, at a sampling rate $1/\Delta$;

a digital modulator (32) connected to the output of the complex transversal filter (31), receiving the carrier frequency ($f_c$) of the modulator (25) of the transmitter (20) with instantaneous values updated once every Baud period $\Delta$;

a circuit (34) subtracting the output signal of the digital modulator (32) from the received signal to provide the input signal to the receiver (40); and a digital demodulator (37) receiving the input signal to the receiver (40) in digital form and the carrier frequency ($f_c$) of the modulator (25) of the transmitter (20) with instantaneous values updated once every Baud period $\Delta$, and providing an output signal which is used to control the weighting coefficients of the complex transversal filter (31).

2. An echo canceller according to claim 1, wherein the digital modulator comprises a circuit selecting and changing the sign of the real or imaginary part of the output signal of the complex transversal filter, said circuit operating at the Baud period $\Delta$.

3. An echo canceller according to claim 1, wherein the digital modulator comprises a sign-changing circuit operating at the Baud period $\Delta$.

4. An echo canceller according to claim 1, wherein the digital complex transversal filter uses, to control its weighting coefficients ($C_j, \ldots C_j^{-n}$) at time jT, a gradient algorithm defined in its general form by the vector equation:

$$C_{j+1} = C_j + \beta e'(jT) B_j^* e^{-i\omega_c p\Delta}$$

in which $C_j$ is the vector whose components at jT are the weighting coefficients $C_j, \ldots C_j^{-n}$ of the complex transversal filter, $C_{j+1}$ is the vector whose components at (j+1)T are the weighting coefficients $C_{j+1}, \ldots C_{j+1}^{-n}$ of the complex transversal filter, $\beta$ is a real positive increment, $e'(jT)$ is the sample at jT of the analytical signal corresponding to the receiver input signal, $B_j^*$ is the transposition of vector $B_j$ whose components are the complex symbols $b_j, \ldots b_{j+n}$ stored in the delay line of the complex transversal filter, $\omega_c$ is the angular frequency corresponding to $f_c$ and p is the largest integer less than or equal to j/l.

5. An echo canceller according to claim 1, characterised in that the complex transversal filter uses, to control its weighting coefficients ($C_j^o, \ldots C_j^{-n}$) at time jT, a gradient algorithm defined in its general form by the vector equation:

$$C_{j+1} = C_j + \beta Re[e'(jT)] B_j^* e^{-\omega_c p\Delta}$$

in which Re $[e'(jT)]$ is the sample of the receiver input signal at jT.

6. An echo canceller according to claim 1, wherein the complex transversal filter uses, to control its weighting coefficients ($C_j^o, \ldots C_j^{-n}$) at time jT, a gradient algorithm defined in its general form by the vector equation:

$$C_{j+1} = C_j + \beta \text{ sign } Re[e'(jT)] B_j^* e^{-i\omega_c p\Delta}.$$

* * * * *